US012515342B2

(12) United States Patent
Debusca et al.

(10) Patent No.: US 12,515,342 B2
(45) Date of Patent: Jan. 6, 2026

(54) ADAPTIVE MOBILE ROBOT BEHAVIOR BASED ON PAYLOAD

(71) Applicant: ST Engineering Aethon, Inc., Pittsburgh, PA (US)

(72) Inventors: David Debusca, Weirton, WV (US);
Spencer W. Allen, Wexford, PA (US);
Joseph S. Beri, Gibsonia, PA (US);
George F. Lucas, Pittsburgh, PA (US);
Anthony Melanson, Wexford, PA (US);
David Peduzzi, Renfrew, PA (US);
Peter T. Seiff, Gibsonia, PA (US)

(73) Assignee: ST Engineering Aethon, Inc., Pittsburgh, PA (US)

( * ) Notice: Subject to any disclaimer, the term of this patent is extended or adjusted under 35 U.S.C. 154(b) by 150 days.

(21) Appl. No.: 18/055,542

(22) Filed: Nov. 15, 2022

(65) Prior Publication Data
US 2023/0150139 A1   May 18, 2023

Related U.S. Application Data

(60) Provisional application No. 63/279,276, filed on Nov. 15, 2021.

(51) Int. Cl.
*B25J 9/16*      (2006.01)
*B25J 5/00*      (2006.01)
(Continued)

(52) U.S. Cl.
CPC ............. *B25J 9/1694* (2013.01); *B25J 5/007* (2013.01); *B25J 9/12* (2013.01); *B25J 11/008* (2013.01);
(Continued)

(58) Field of Classification Search
CPC ... B25J 9/1694; B25J 5/007; B25J 9/12; B25J 11/008; B25J 9/162; B60D 1/01;
(Continued)

(56) References Cited

U.S. PATENT DOCUMENTS

| 1,016,871 A | 2/1912 | Brooks et al. |
| 7,100,725 B2 | 9/2006 | Thorne |

(Continued)

FOREIGN PATENT DOCUMENTS

| CN | 206412511 U | 8/2017 |
| DE | 102011085019 A1 | 4/2012 |

(Continued)

OTHER PUBLICATIONS

International Search Report for PCT/US2022/049931 dated Jun. 20, 2023.

(Continued)

*Primary Examiner* — Dylan M Katz
(74) *Attorney, Agent, or Firm* — Buchanan Ingersoll & Rooney PC

(57) ABSTRACT

Embodiments relate to a robotic system having a plurality of sensors attached to a robot. The system includes an identifier attached to a receiver hitch of a cart. The identifier includes information related to a cart with which the identifier is attached. At least one sensor of the plurality of sensors is configured to detect the identifier and transmit sensor data to a computing unit of the robot. The computing unit of the robot operates the robot and/or the plurality of sensors based on the cart information. Some embodiments include a facility sensor attached to a facility. The facility sensor is configured to detect presence or absence of a cart.

20 Claims, 10 Drawing Sheets

(51) Int. Cl.
*B25J 9/12* (2006.01)
*B25J 11/00* (2006.01)
*B60D 1/00* (2006.01)
*B60D 1/01* (2006.01)
*B60D 1/36* (2006.01)
*B60D 1/46* (2006.01)
*B60L 53/16* (2019.01)
*B60L 53/36* (2019.01)
*G05D 1/00* (2024.01)
*H01R 35/04* (2006.01)
*H02J 7/00* (2006.01)

(52) U.S. Cl.
CPC ............... *B60D 1/01* (2013.01); *B60D 1/36* (2013.01); *B60D 1/46* (2013.01); *B60L 53/16* (2019.02); *B60L 53/36* (2019.02); *G05D 1/0212* (2013.01); *G05D 1/0225* (2013.01); *H01R 35/04* (2013.01); *H02J 7/0042* (2013.01); *B60D 2001/005* (2013.01); *H01R 2201/26* (2013.01)

(58) Field of Classification Search
CPC ...... B60D 1/36; B60D 1/46; B60D 2001/005; B60D 1/62; B60L 53/16; B60L 53/36; B60L 2200/40; G05D 1/0212; G05D 1/0225; G05D 1/247; G05D 1/667; G05D 2105/28; G05D 2107/70; G05D 2111/34; H01R 35/04; H01R 2201/26; H02J 7/0042; H02J 7/0044; G05B 2219/50393; Y02T 10/70
See application file for complete search history.

(56) References Cited

U.S. PATENT DOCUMENTS

| | | | |
|---|---|---|---|
| 9,223,313 | B2 | 12/2015 | Wolfe et al. |
| 10,668,617 | B2 | 6/2020 | Jacobsen |
| 2004/0201361 | A1 | 10/2004 | Koh et al. |
| 2010/0025964 | A1 | 2/2010 | Fisk et al. |
| 2014/0203776 | A1 | 7/2014 | Ireland et al. |
| 2017/0072558 | A1 | 3/2017 | Reynolds et al. |
| 2017/0242427 | A9* | 8/2017 | High .................. G06Q 30/0633 |
| 2019/0016264 | A1 | 1/2019 | Potnis et al. |
| 2019/0061446 | A1 | 2/2019 | Fujihara et al. |
| 2019/0155296 | A1 | 5/2019 | Moore et al. |
| 2019/0210418 | A1 | 7/2019 | Hall et al. |
| 2019/0233034 | A1 | 8/2019 | Viele et al. |
| 2019/0248007 | A1* | 8/2019 | Duffy .................. B25J 15/0066 |
| 2019/0302764 | A1 | 10/2019 | Smith et al. |
| 2019/0337564 | A1 | 11/2019 | Tanaka et al. |
| 2019/0372364 | A1 | 12/2019 | Brady et al. |
| 2019/0381843 | A1 | 12/2019 | Miyamoto et al. |
| 2020/0207167 | A1 | 7/2020 | Goncalves et al. |
| 2020/0229668 | A1* | 7/2020 | Bone .................. A47L 11/4005 |
| 2020/0254607 | A1 | 8/2020 | Ejstrup Hansen et al. |
| 2020/0262304 | A9 | 8/2020 | Kwa et al. |
| 2020/0370998 | A1 | 11/2020 | Amacker et al. |
| 2021/0001480 | A1 | 1/2021 | Artes et al. |
| 2021/0101748 | A1 | 4/2021 | Helsel et al. |
| 2021/0155410 | A1* | 5/2021 | Takai .................. B65G 1/1375 |
| 2022/0088980 | A1 | 3/2022 | Richter |

FOREIGN PATENT DOCUMENTS

| | | |
|---|---|---|
| EP | 2573040 A1 | 3/2013 |
| GB | 2585092 A | 12/2020 |
| KR | 101146907 B1 | 5/2012 |
| KR | 101280908 B1 | 7/2013 |

OTHER PUBLICATIONS

Written Opinion of the International Searching Authority for PCT/US2022/049931 dated Jun. 20, 2023.
International Search Report for PCT/US2022/049934 dated Mar. 27, 2023.
Written Opinion of the International Searching Authority for PCT/US2022/049934 dated Mar. 27, 2023.
International Search Report for PCT/US2022/049936 dated Apr. 25, 2023.
Written Opinion of the International Searching Authority for PCT/US2022/049936 dated Apr. 25, 2023.
Partial Supplementary European Search Report for European Application No. 22893732.2 dated Dec. 11, 2024.

* cited by examiner

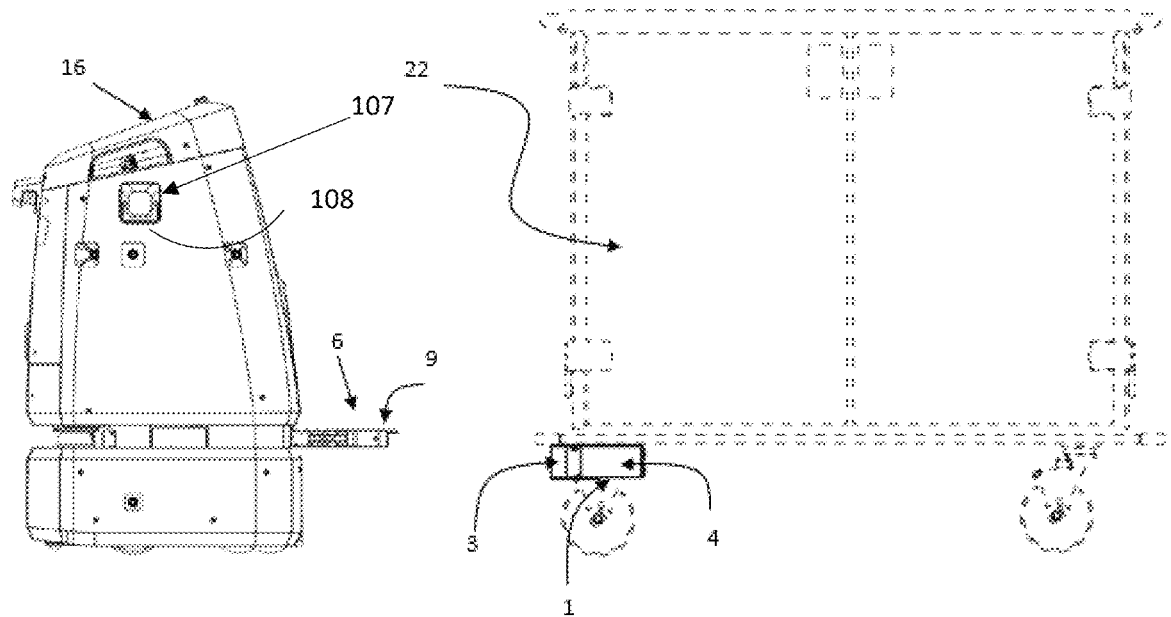
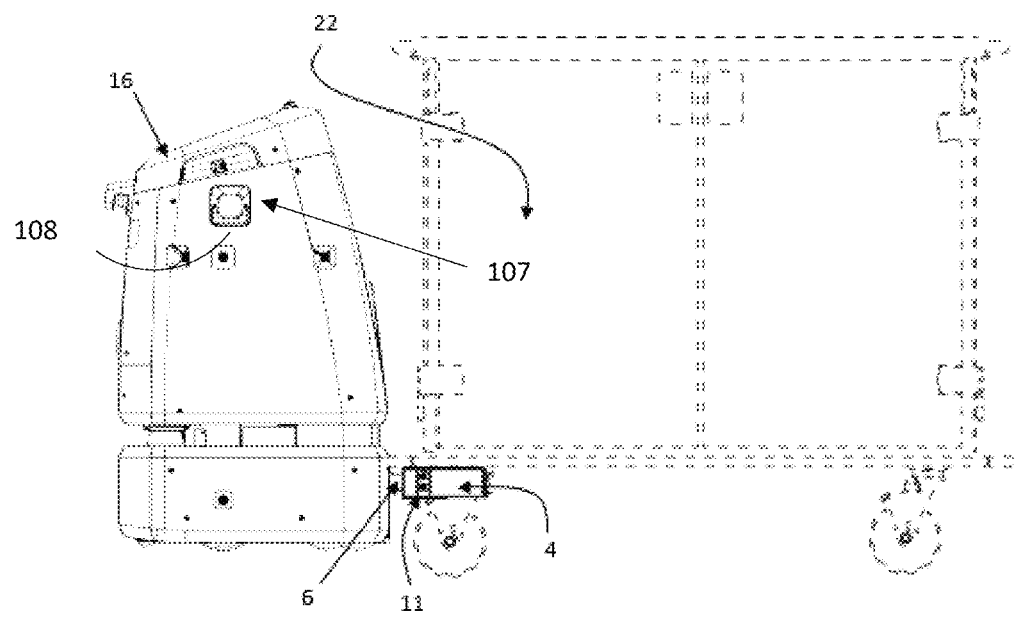
FIG 6

```
┌─────────────────────────────────────────────────────────────────────────────────┐
│ THE ROBOT ARRIVES WITH THE CART AT THE SPECIFIED DELIVERY LOCATION AND COMES TO A STOP. │
│                                       201                                        │
└─────────────────────────────────────────────────────────────────────────────────┘
                                         ↓
┌─────────────────────────────────────────────────────────────────────────────────┐
│ IT RETRACTS THE END PINS ON THE END EFFECTOR TO RELEASE THE TOW ARM FROM THE HITCH. │
│                                       202                                        │
└─────────────────────────────────────────────────────────────────────────────────┘
                                         ↓
┌─────────────────────────────────────────────────────────────────────────────────┐
│ IT DRIVES FORWARD WITH THE TOW ARM STILL EXTENDED FAR ENOUGH TO CLEAR THE TOW ARM FROM THE CART │
│              AS DETECTED BY ITS CAMERA AND SENSORS.                             │
│                                       203                                        │
└─────────────────────────────────────────────────────────────────────────────────┘
                                         ↓
┌─────────────────────────────────────────────────────────────────────────────────┐
│ IT RAISES THE TOW ARM INTO ITS STOWING LOCATION, AND DEPARTS TO ITS NEXT OR DEFAULT LOCATION │
│                                       204                                        │
└─────────────────────────────────────────────────────────────────────────────────┘
```

FIG 8

ADAPTIVE MOBILE ROBOT BEHAVIOR BASED ON PAYLOAD

CROSS-REFERENCE TO RELATED APPLICATIONS

This application is related to and claims the benefit of and priority to U.S. Application No. 63/279,276, filed on Nov. 15, 2022, the entire contents of which are incorporated herein by reference.

FIELD OF THE INVENTION

The present invention relates to the transportation of carts and other loads within, for example, an indoor commercial environment using an autonomous mobile robot. More specifically, the present invention provides for a plurality of cart types to be identified and automatically towed using a uniformly configured mobile robot and a standard cart-attachment mechanism through means of cart type identification and robot self-configuration.

BACKGROUND OF THE INVENTION

Transporting goods on wheeled carts is labor intensive, repetitive, exhausting and potentially hazardous work. This is particularly true in healthcare, hospitality, warehouse and industrial settings. Thus, the automatic movement of these carts would provide numerous benefits, financially and otherwise, to an organization and its employees.

However, the economics and complexity involved in designing and developing carts compatible with robotic automation is prohibitive. Current autonomous mobile robots require retro-fitting cart bases onto the existing carts so the robot can interface with them. Current autonomous mobile robots used for hauling purposes drive under the cart base to raise or connect the cart onto its platform in order to drive with it. The retrofit cart bases establish a known size so the robot can correctly calculate its navigation and localization envelope. However, these retrofit cart bases not only require labor for installation, but they are an unnecessary replacement of the made-for-purpose wheels that already exist on the cart. In addition, retrofitting a large volume of carts can incur large expenses due to costs associated with the retrofit cart bases and the cost of installation can become very expensive.

However, without a cart base establishing a fixed and known footprint a mobile robot would be unable to accurately or safely navigate its surroundings since the width and length of the load could be variable.

Mobile robots which pull carts are known in the art. They are typically designed with a specific gripper or attachment modality affixed to the robot. The gripper/attachment modality is designed to latch onto to a uniform and specific type of cart construction. This results in a robot that must be dedicated to a single type of cart or cart base, thereby limiting its utility in an environment in which many cart types are used contemporaneously. In addition, without a fixed and known size of the load, the robot's sensor coverage is typically obscured, and this potentially results in unsafe operation.

U.S. Pat. No. 7,100,725 discloses a robotic cart pulling vehicle, but does not disclose a mechanism of cart attachment.

U.S. Pat. No. 9,223,313 discloses a server communicating with robot(s) for the purposes of prioritization, managing navigational issues, failed equipment in the environment, and the relative state and position of other robots.

U.S. Pat. No. 10,668,617 discloses a hook mechanism on a pivoting arm to tow carts. The hook disclosed requires all carts to have a uniform construction in order to be attached. In addition, the robot does not self-adjust its physical configuration of sensors based on the type of cart being towed.

U.S. Publication No. 2020/0254607 discloses a base used to interface to a mobile robot for the purpose of moving the load. It describes pins on side edge of the robot which extend beyond the edges of the robot into the disclosed base design in order to lift the base in the vertical direction so it can be transported.

U.S. Pat. No. 10,168,711 discloses an autonomous mobile robot that latches onto a modified cart base for pickup.

The present disclosure is directed toward overcoming one or more of the above-mentioned problems, though not necessarily limited to embodiments that do.

SUMMARY OF THE INVENTION

Embodiments of the present invention relate to a system to allow a mobile robot to adapt its behavior to the load being towed by a tow arm connected to a mounting hitch attached to the cart. Embodiments provide for autonomous attachment, towing, and delivery of carts.

An exemplary embodiment of the present invention uses the physical features of a universal hitch, and not physical features of the cart itself, to determine initial positional data for the robot. Embodiments include a unique identifier (e.g., RFID tag, visual label, barcode, QR code, etc.) on the hitch. The identifier can include a serial number, for example. The serial number can be embedded within a passive RFID tag or a visual label placed on the receiver hitch, for example. When the robot encounters a cart with the receiver hitch, it is able to detect the identifier via a scanner, camera, antenna, etc. included on the robot. Each unique cart serial number is registered in a database and assigned cart attributes such as (but not limited to) height of receiver hitch, length of cart, height of cart, width of cart, maximum weight, etc. The database stores additional parameters for cart handling and communicates with the robot accordingly. An advantage of this approach is to allow a single robot to dynamically adjust itself to tow different cart types based on attributes of each cart type it is towing. Data obtained from the database can be used to determine whether a cart positioned at a location should be moved or delivered. This determination can also be based on information obtained from the identifier and automatically dispatch robots and/or carts accordingly.

In some embodiment, the robot can adjust its sensor coverage and respond to different cart types being pulled. When the robot detects and classifies the cart described by an embodiment of a method disclosed herein (e.g., using database information), the robot electromechanically adjusts its sensors (based on the returned parameters from the database) to extend beyond the outside edges of the cart. An advantage of the self-adjusting sensors is that it provides sideward and rearward sensor coverage when the cart exceeds the default sensor envelope of the robot. Another advantage is that the sensors retract when not carrying a cart so the robot can move through standard commercial doorways and other passages.

Additionally, the classification of the cart allows the robot to adjust its travel and accommodate for the size of the load being towed. For example, if one cart is longer than another, the robot can appropriately plan its travel route around corners and/or obstacles. As a second example, if a cart profile indicates a height or a potential weight exceeding certain limits, the robot can automatically restrict itself to certain travel areas.

In some embodiments, a scanner, camera, antenna, etc. can be placed at predetermined location (e.g., a staging area, a workstation, etc.) to monitor for carts having an identifier. This can be done to determine if a cart is present for pickup at a location in order to automatically initiate a pickup of that cart or to determine if the space is empty so as to automatically initiate a delivery of a cart. In an exemplary embodiment, an antenna at the location detects one or more RFID signals, or the absence of one or more RFID signals from the receiver hitch. In some cases, a cart has to be retrieved (e.g., the cart is empty, no longer needed at the location, is needed at a different location, etc.) and the presence of the RFID signal(s) along with information from the database can be used to correlate the presence of the cart with the antenna location to automatically schedule a pickup of the cart. In other cases, the absence of one or more RFID signals may indicate the need for the location to be replenished with supplies.

An exemplary embodiment relates to a robotic system. The robotic system includes a plurality of robot sensors attached to a robot. The robotic system includes an identifier attached to a receiver hitch of a cart. The identifier includes information related to a cart on which the identifier is attached. At least one robot sensor of the plurality of robot sensors is configured to detect the identifier and transmit sensor data to a computing unit of the robot. The computing unit of the robot operates the robot and/or the plurality of robot sensors based on the cart information.

In some embodiments, the robotic system includes a facility sensor attached to a facility. The facility sensor is configured to detect presence or absence of a cart.

In some embodiments, the robotic system includes the robot.

In some embodiments, the robotic system includes the receiver hitch.

In some embodiments, the robotic system includes the cart.

In some embodiments, the robotic system includes the computing unit of the robot.

In some embodiments, the facility sensor is attached to a structure at a predetermined location of the facility.

In some embodiments, the location is a delivery location or a pick-up location for the cart.

In some embodiments, the facility sensor is configured to transmit sensor data to a computer of a computer system.

In some embodiments, at least one robot sensor of the plurality of robot sensors is an antenna and the identifier is a RFID tag.

In some embodiments, the robotic system includes the computing unit of the robot. The computing unit includes instructions stored on memory that cause a processor of the computing unit to feed cart information to a navigation engine to generate and/or modify autonomous or semi-autonomous operation protocols based on the cart information.

In some embodiments, the processor of the computing unit converts the autonomous or semi-autonomous operation protocols into a command signal to operate the robot.

In some embodiments, the command signal includes which path to follow, which path to not follow, a speed limit for the robot, and/or a limit on turning radius for the robot.

In some embodiments, the operation protocols are based on a dimension of the cart, the cart type, and/or a weight restriction for the cart.

In some embodiments, the computing unit of the robot includes instructions stored on memory that cause the processor of the computing unit to adjust a physical orientation and/or an operational parameter of at least one robot sensor of the plurality of robot sensors. In some embodiments, the adjustment the physical orientation and/or the operational parameter of the at least one robot sensor of the plurality of robot sensors is based on a dimension of the cart, the cart type, and/or a weight restriction for the cart.

In some embodiments, the robotic system includes the computer of the computer system. The computer includes instructions stored on memory that cause a processor of the computer to determine presence or absence of the cart at the predetermined location.

In some embodiments, the instructions cause the processor of the computer to transmit a command signal to the computing unit of the robot based on the determined presence or absence of the cart at the predetermined location.

In some embodiments, the instructions cause the processor of the computer to transmit a command signal to the computing unit of the robot to cause the robot to travel to the predetermined location at which the presence of the cart is determined.

An exemplary embodiment relates to a robotic system. The robotic system includes a computing unit for a robot, the computing unit including a navigation engine configured to generate and/or modify autonomous or semi-autonomous operation protocols for the robot. The robotic system includes an identifier attached to a receiver hitch of a cart. The robotic system includes a plurality of sensors attached to a robot, at least one sensor of the plurality of sensors configured to detect the identifier. The operation protocols include rules causing the robot to travel to a location to retrieve the cart. The computing unit is configured to receive sensor data and determine the presence or absence of the cart at the location. When the absence of the cart at the location is determined, the computing unit causes the robot to remain at the location. When the presence of the cart at the location is determined, the computing unit causes the robot to engage the receiver hitch with a tow arm of the robot.

In some embodiments, the robotic system includes a user interface for the robot, the user interface in communication with the computing unit. When the absence of the cart at the location is determined, the computing unit causes the user interface to generate a message indicating that the robot is remaining at the location.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

FIG. 6 are side views showing an exemplary robot deploying the tow arm for connection to the receiver hitch in order to tow the cart in accordance with an embodiment of the present invention.

FIG. 8 illustrates a flowchart depicting exemplary steps performed for an autonomous mobile robot to deliver a cart to a desired location in accordance with an embodiment of the present invention.

DETAILED DESCRIPTION OF THE INVENTION

Figure 1:
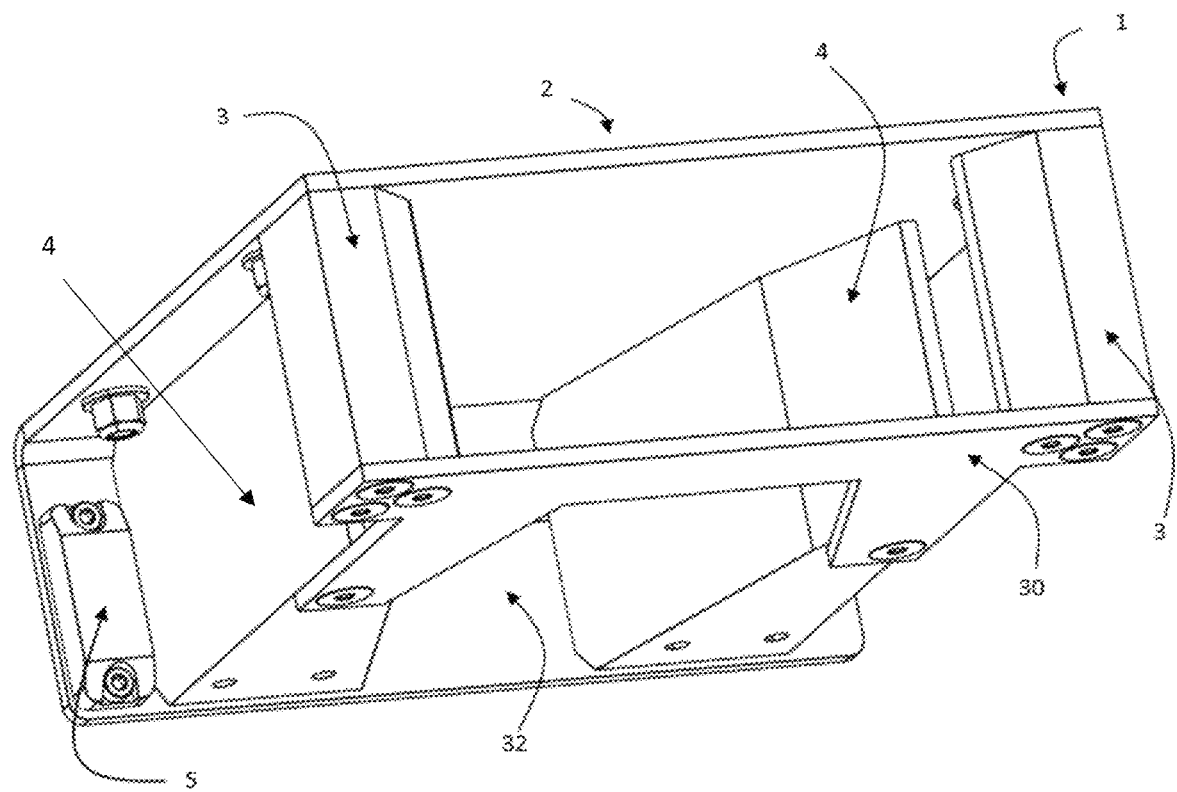
FIG. 1 is an isometric view of an exemplary receiver hitch in accordance with an embodiment of the present invention.

FIG. 1 illustrates a perspective view of an embodiment of a receiver hitch (1) designed for attachment to carts (22) of various types. The receiver hitch (1) includes a top mounting plate (2) generally configured for attachment to the bottom surface of a cart (22). Side posts (3) extend downward from the mounting plate (2) and between the mounting plate (2) and a cross member (30). Converging side members (4) allow the tow arm end effector to approximately center itself on the rear plate (32). Once centered the end effector clamps (11) onto the side posts (3) to secure the receiver hitch (1) to the tow arm (6). An exemplary identifier (5), for example in the form of an RFID tag, is attached to a rear plate (32) of the hitch (1).

As can be appreciated from the exemplary embodiment shown in FIG. 1, embodiments of the robot (16) include a receiver hitch (1). The receiver hitch (1) is a coupling device configured to facilitate mechanical engagement (e.g., attachment, securement, coupling, fastening, etc.) between it and another object (e.g., a tow arm (6) and/or an end effector (11) of a tow arm (6)). It is contemplated for the tow arm (6) to be part of a robot (16). The receiver hitch (1) is configured to be attached (e.g., via a weld, fastener, etc.) to a portion (e.g., body, frame, chassis, etc.) of a cart (22). This attachment can be permanent or temporary. The receiving hitch (1) opening providing ingress and egress of the object. The receiving hitch (1) is configured to facilitate attachment of the tow arm (6) to the cart (22). For instance, when the receiver hitch (1) is attached to the cart (22) and the tow arm (6) is mechanically engaged with the receiver hitch (1), the tow arm (6) is then mechanically engaged with the cart (22). With the tow arm (6) being part of a robot (16), the robot (16) is also mechanically engaged with the cart (22). It is contemplated for the mechanical engagement to be temporary and controlled via actuation of an end effector (11). The receiver hitch (1) can further include at least two side members (4), each positioned between the rear plate (32) and a side post (3)—e.g., there can be one side member (4) for one side of the receiver hitch (1) and one side member (4) for an opposing side of the receiver hitch (1). Actuation of the end effector (9) will be discussed in more detail later.

Figure 2A:
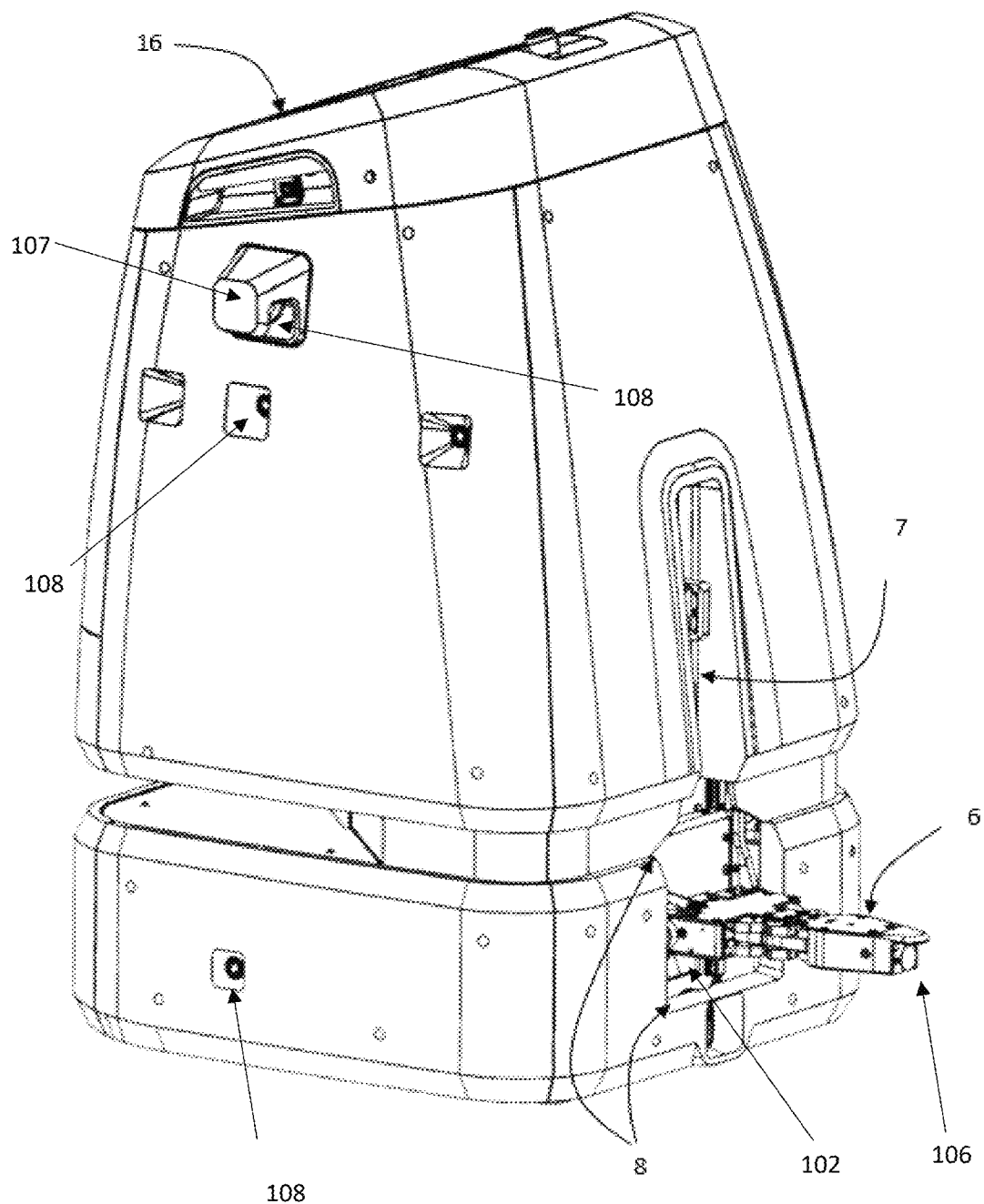
FIGS. 2A and 2B are isometric views of the rear of an exemplary autonomous mobile robot having a tow arm for hauling carts in accordance with an embodiment of the present invention.
Figure 2B:
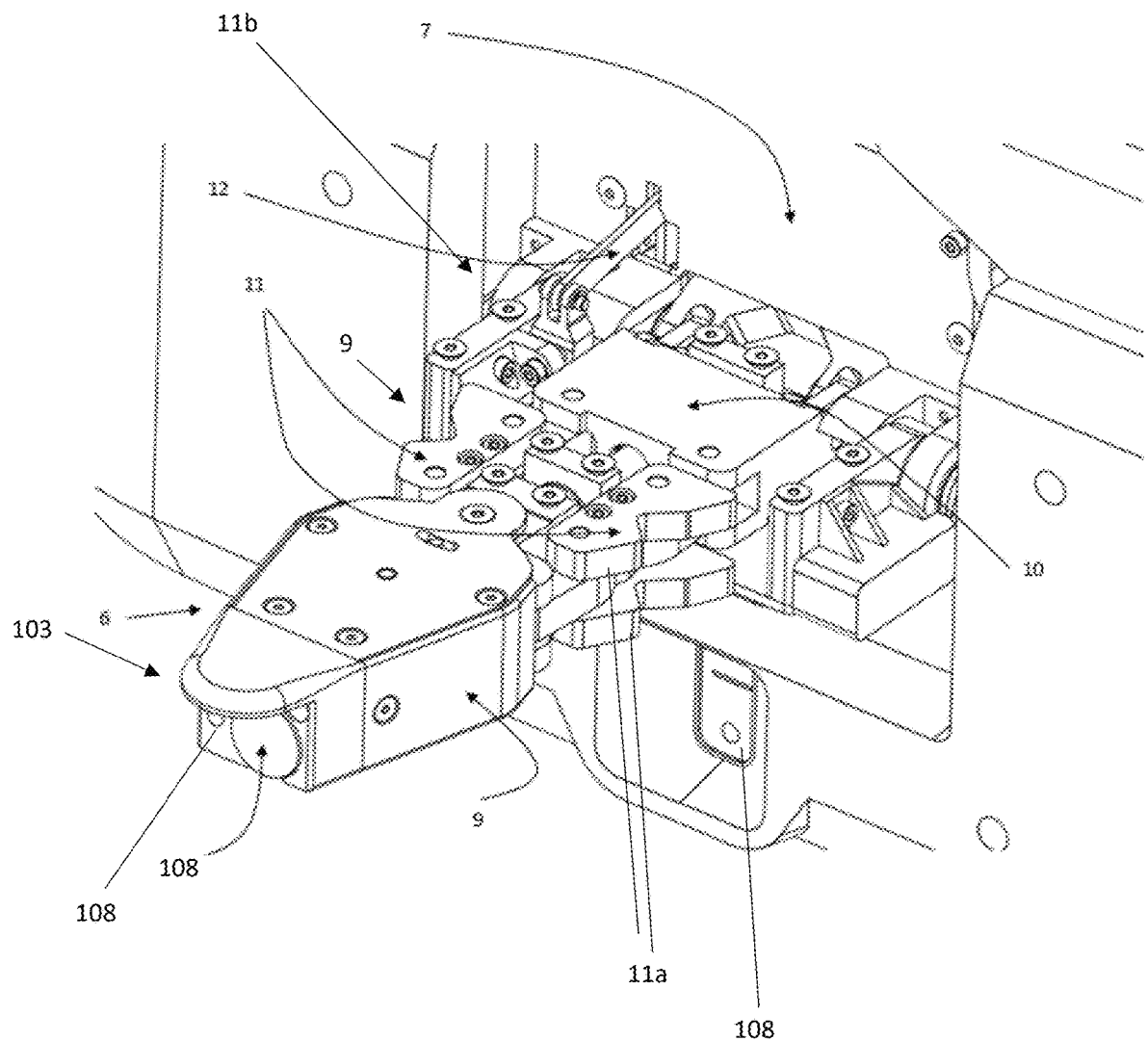

FIGS. 2A and 2B illustrate rear, perspective views of an embodiment of the autonomous mobile robot (16) used for hauling carts. The robot (16) includes a tow arm (6) configured to mate (e.g., form a mechanical engagement) with the receiver hitch (1). FIG. 2 illustrates the tow arm (6) in the deployed state for mating with the receiver hitch (1). The tow arm (6) is movable in a vertical direction by means of a linear actuator (10). The vertical range of travel of the tow arm (6) is shown at (8). The robot (16) additionally includes a stowing zone (7) configured to stow the tow arm (6) when not in use. The tow arm (6) may be pivoted into the stowing zone (7) and secured therein when not in use. When deployed for use, the tow arm (6) is pivoted out of the stowing zone (7) to the position shown in FIG. 2, and then moved up/down to the desired position via the linear actuator (10).

The tow arm (6) is an elongate member having a pivot end (102) and a head end (103). The head (103) can have a rectangular-, square-, spear-, etc. shape. In an exemplary embodiment, the head has a spear shape. The spear shape can assist with guiding the tow arm (6) into the receiver hitch (1). The pivot end (102) can include a pivot mechanism (12) that is a hinge, turret, gimbal, etc. with a motor, encoder, actuator, servo, etc. The pivot mechanism is attached to the robot (16). The pivot mechanism (12) can be configured to pivot the tow arm (6) to and from stowed and deployed positions. For instance, the pivot mechanism (12) can cause the tow arm (6) to pivot to an orientation that is defined by the tow arm (6) being parallel to the ground floor upon which the robot (16) is sitting. This can be the deployed position. The pivot mechanism (12) can cause the tow arm (6) to pivot to an orientation that is defined by the tow arm (6) being perpendicular to the ground floor. This can be the stowed position. The pivoting motion can be a vertical motion (vertical with respect to the ground floor-see range of motion 8), a lateral/horizontal motion (lateral/horizontal with respect to the ground floor), etc. In some embodiments, the robot (16) includes a stowing zone (7) that is an indentation or cut-out formed in a surface of the robot (16). The stowing zone (7) is sized to accommodate the tow arm (6) when the tow arm (6) is pivoted to the stowed position— e.g., the tow arm (6) recesses into the indentation.

Figure 5:
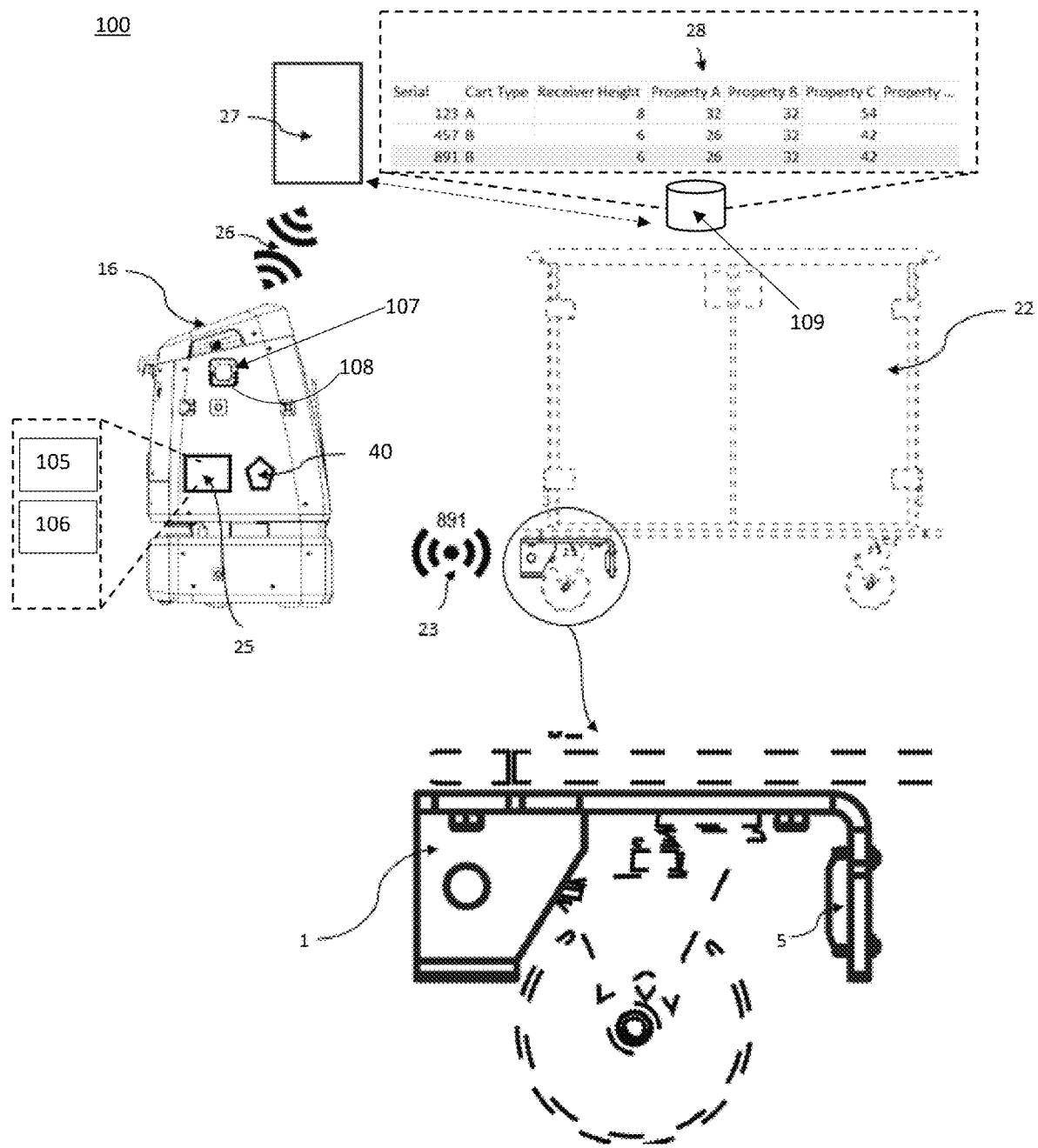
FIG. 5 are side views illustrating an exemplary robot identifying the cart, including the look-up parameters of the cart in accordance with an embodiment of the present invention.

Referring to FIG. 5, the robot (16) includes a computing unit (25). The computing unit (25) can be a controller, a control module, etc. The computing unit (25) includes a processor (105) and associated memory (106). Other components of the robot (16) or system controlling the robot may also have a processor. Any of the processors disclosed herein can be part of or in communication with a machine (e.g., a computer device, a logic device, a circuit, an operating module (hardware, software, and/or firmware), etc.). The processor can be hardware (e.g., processor, integrated circuit, central processing unit, microprocessor, core processor, computer device, etc.), firmware, software, etc. configured to perform operations by execution of instructions embodied in computer program code, algorithms, program logic, control, logic, data processing program logic, artificial intelligence programming, machine learning programming, artificial neural network programming, automated reasoning programming, etc. The processor can receive, process, and/ or store data related to operations of the robot (16) or a component of the robot (16).

Any of the processors disclosed herein can be a scalable processor, a parallelizable processor, a multi-thread processing processor, etc. The processor can be a computer in which the processing power is selected as a function of anticipated network traffic (e.g., data flow). The processor can include any integrated circuit or other electronic device (or collection of devices) capable of performing an operation on at least one instruction, which can include a Reduced Instruction Set Core (RISC) processor, a CISC microprocessor, a Microcontroller Unit (MCU), a CISC-based Central Processing Unit (CPU), a Digital Signal Processor (DSP), a Graphics Processing Unit (GPU), a Field Programmable Gate Array (FPGA), etc. The hardware of such devices may be integrated onto a single substrate (e.g., silicon "die"), or distributed among two or more substrates. Various functional aspects of the processor may be implemented solely as software or firmware associated with the processor.

The term "associated with" used herein includes attached to, incorporated, applied to, connected to, in communication with, paired with, etc.

The processor can include one or more processing or operating modules. A processing or operating module can be a software or firmware operating module configured to implement any of the functions disclosed herein. The processing or operating module can be embodied as software and stored in a memory, the memory being operatively associated with the processor. A processing module can be embodied as a web application, a desktop application, a console application, etc.

The processor can include or be associated with a computer or machine readable medium. The computer or machine readable medium can include memory. Any of the memory discussed herein can be computer readable memory configured to store data. The memory can include a volatile or non-volatile, transitory or non-transitory memory, and be embodied as an in-memory, an active memory, a cloud memory, etc. Examples of memory can include flash memory, Random Access Memory (RAM), Read Only Memory (ROM), Programmable Read only Memory (PROM), Erasable Programmable Read only Memory (EPROM), Electronically Erasable Programmable Read only Memory (EEPROM), FLASH-EPROM, Compact Disc (CD)-ROM, Digital Optical Disc DVD), optical storage, optical medium, a carrier wave, magnetic cassettes, magnetic tape, magnetic disk storage or other magnetic storage devices, or any other medium which can be used to store the desired information and which can accessed by the processor.

The memory can be a non-transitory computer-readable medium. The term "computer-readable medium" (or "machine-readable medium") as used herein is an extensible term that refers to any medium or any memory, that participates in providing instructions to the processor for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, transmission media, etc. The computer or machine readable medium can be configured to store one or more instructions thereon. The instructions can be in the form of algorithms, program logic, etc. that cause the processor to execute any of the functions disclosed herein.

Embodiments of the memory can include a processor module and other circuitry to allow for the transfer of data to and from the memory, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach or protocol for controlled and coordinated signal transmission and processing to any other component or combination of components of the communication system. The transmission can be via a communication link. The communication link can be electronic-based, optical-based, opto-electronic-based, quantum-based, etc. Communications can be via Bluetooth, near field communications, cellular communications, telemetry communications, Internet communications, etc.

Transmission of data and signals can be via transmission media. Transmission media can include coaxial cables, copper wire, fiber optics, etc. Transmission media can also take the form of acoustic or light waves, such as those generated during radio-wave and infrared data communications, or other form of propagated signals (e.g., carrier waves, digital signals, etc.).

Any of the processors can be in communication with other processors of other devices (e.g., a computer device, a computer system, a laptop computer, a desktop computer, etc.). Any of the processors can have transceivers or other communication devices/circuitry to facilitate transmission and reception of wireless signals. Any of the processors can include an Application Programming Interface (API) as a software intermediary that allows two or more applications to talk to each other. Use of an API can allow software of the processor of one device/component to communicate with software of the processor of the other device(s)/component(s).

It is contemplated for the computing unit (25) to be in communication with other components of the robot (16) or system (100) (e.g., tow arm (6), pivot mechanism (12), end effector (9), clamp(s) (11), linear actuator (10), side arm(s) (107), sensor(s) (108), computer (27), database (109), antenna (40), user interface (110), etc.). Any one or combination of these components may or may not have a processor. The computing unit (25) can send command signals to the processor of these components or control electrical power transmission to these components to operate them directly. In addition, any of the components of the robot (16) can be in communication with another component. The communication can include the transmission of information data, operational data, command signals, etc. In other words, any component of the robot (16) can talk to other components of the system. This talking can be via direct communication between each component, or it can be via indirect communication via the computing unit (25).

The robot (16) includes a user interface (110), which can be a display screen, keypad, touchscreen, etc. configured to display information, receive input, facilitate command and control of one or more functions of the robot (16) or components of the robot (16), etc. The display of the user interface can be textual display, graphical display, audible display, etc. Command inputs can be textual, haptic, audible, etc.

As noted above, the tow arm (6) is an elongate member having a pivot end (102) and a head end (103). The tow arm (6) can include an end effector (9) located intermediate the pivot end (102) and head end (103). The end effector (9) is configured to interact with, interface with, mechanically engage with, electrically engage with, magnetically engage with etc. the receiver hitch (1) and/or the robot (16). In an exemplary embodiment, the end effector (9) includes at least one clamp (11). The clamp (11) can be pivotally connected member that pivots inward and outward. For instance, the clamp (11) can be a spring-loaded member that is biased outward but can move inward. The clamp (11) can have barb or hook formations (11a) that engage the side post(s) (3), thereby mechanically engaging the tow arm (6) to the receiver hitch (1). As another example, the clamp (11) can include a clamp actuator (11b) (e.g., a linear actuator) to cause the clamp (11) to move inward and outward. With the clamp actuator (11b). the clamp (11) can be pivotally connected or connected via a slide track.

In an exemplary embodiment, the end effector (9) has first clamp (11) on one side of the tow arm (6) and a second clamp (11) on another side of the tow arm (6). When the tow arm (6) is inserted in the receiver hitch (1), the first clamp (11) can be caused to selectively engage and disengage a first side post (3) and the second clamp (11) can be caused to selectively engage and disengage a second side post (3).

The robot (16) can include any number or combination of sensors (108) (e.g., the sensor (108) can be attached to or associated with the robot (16)). The term "associated with" used herein includes attached to, incorporated, applied to, connected to, in communication with, paired with, etc. If physically attached to the robot (16), any of the sensor(s) (108) can be located on any portion of the robot (16). Any one or combination of sensors (108) can be proximity sensors, temperature sensors, pressure sensors, accelerometers, vibration sensors, sonar sensors, LIDAR sensors, RADAR sensors, cameras, antenna, etc. Any of the sensors disclosed herein can include a processor or transmit measurement data to the computing unit (25) for data processing. Data processing can include signal processing, data manipulation, logic analysis, fuzzy logic, probabilistic analysis, interpolation, extrapolation, inferencing, regression analysis, multivariant analysis, machine learning, machine inference learning, artificial intelligence, automated reasoning, optical character recognition, vision interpretation, vision inferencing, etc.

In an exemplary embodiment, the robot (16) has two side sensors (108)—e.g., a first sensor (108) located on one side of the robot (16) and a second sensor (108) located on an opposite side of the robot (16). Each side sensor (108) can be disposed on a distal end of a side arm (107). It is contemplated for these side sensors to be any one or combination of sonar sensors, LIDAR sensors, RADAR sensors, cameras, etc. These sensors (108) can be used to assist the robot (16) in navigation, accident avoidance, positioning, determining if there is a cart (22) present, determining if there is an object or obstacle in the robot's (16) path, etc.

Figure 4:
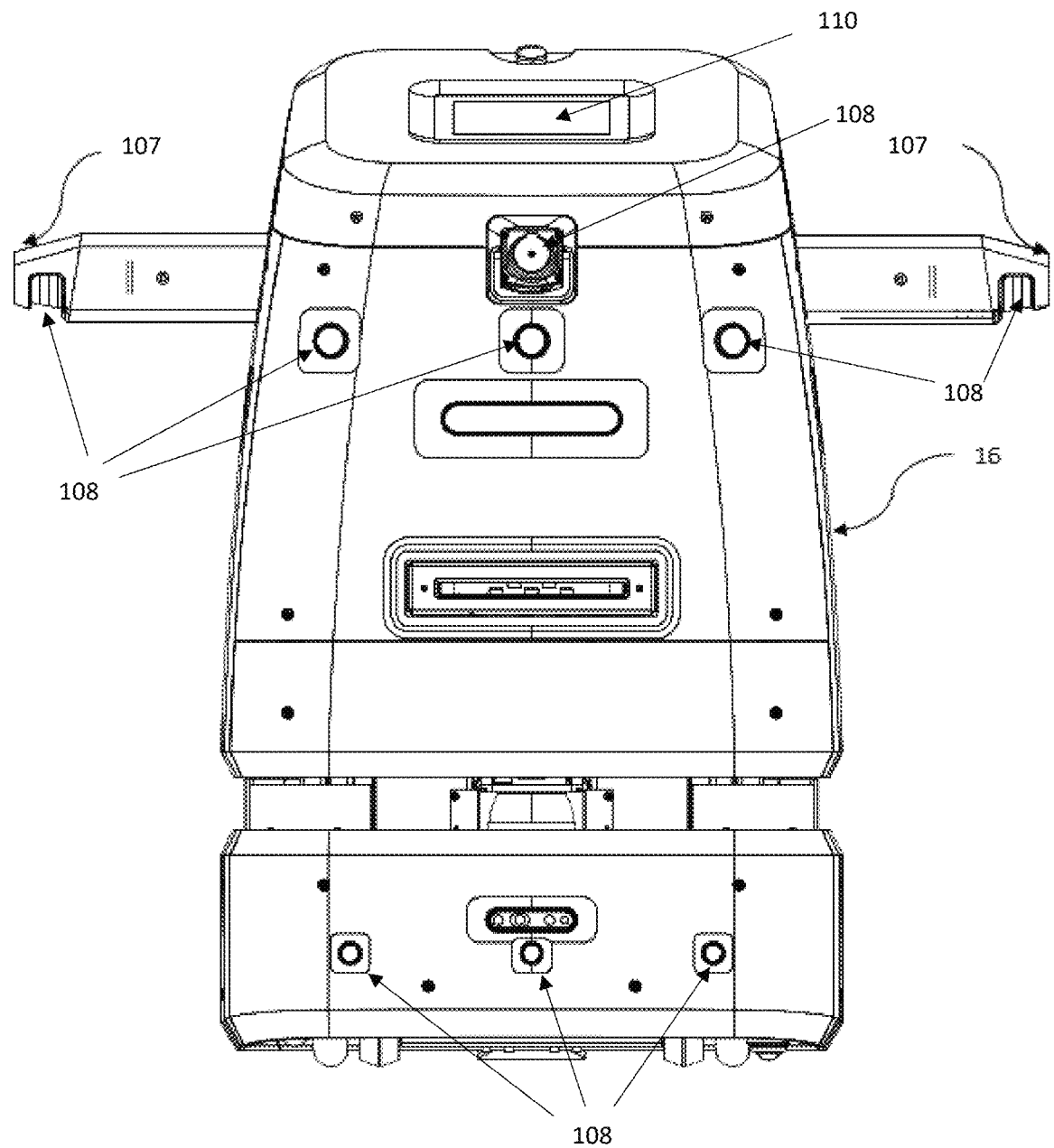
FIG. 4 is a front view of an exemplary robot with the extendable side sensors extended to allow the sensors to see beyond the edge of a cart being pulled in accordance with an embodiment of the present invention.

The arm (107) can be extendable and retractable—e.g., each arm (107) can be connected to a linear actuator, encoder, motor, servo, etc. can causes the arm (107) to extend and retract from and into an arm cavity of the robot (16). FIG. 2A shows each arm (107) in a retracted position and FIG. 4 shows each arm in an extended position. Each arm (107) can have a processor that controls the arm (107) or have its actuator component in communication with the computing unit (25), wherein the computing unit (25) controls the arm (107). Each arm (107) can be extended to position its respective sensor (108) in an optimal location for sensing. For instance, if an obstruction is detected or if a sensor(s) (108) detects mechanical engagement with a cart (22) (e.g., via mechanical engagement between a tow arm (6) and receiver hitch (1)), any one or combination of the arms (107) can be extended to provide the sensor (108) with a desired field of view, a desired parallax, etc. As a non-limiting example, if mechanical engagement with a cart (22) is detected, any one or combination of the arms (107) can be extended to allow the sensor(s) (108) to have field of view that extends around and/or beyond the cart (22). Otherwise, the arms (107) can be retracted so as to reduce the profile of the robot (16). Also, it is contemplated for the arms (107) to be extended only as far out as needed for navigation so as to maintain a small as possible profile for the robot (16). The dimensions of the cart (22) or object can be determined via the sensor data and/or via a lookup table (e.g., a lookup table stored in a database (109)). These dimensions can be used to determine how far to extend the arm(s) (107). It should be noted that there can be any number of arms (107) and any number of sensors (108) for each arm (107).

Exemplary embodiments show the arms (107) positioned on the side of the robot (16); however, the robot (16) can have any number or combination of arms (107) positioned at any location. For instance, the robot (16) can have an arm (107) located at the top of the robot (16) (e.g., the top arm (107) can be used in a periscope manner).

As noted above, the dimensions of the cart (22) or object can be determined via sensor data and/or via a lookup table. These dimensions can be used by any of the processors disclosed herein to determine how far to extend the arm(s) (107). These dimensions can also allow any of the processors to determine how far to pivot the tow arm (6) (e.g., via actuation of the pivot mechanism (12)), at which vertical/horizontal position the tow arm (6) should be in (e.g., via actuation of the linear actuator (10)), how to position/reposition the robot (16) (e.g., via actuation of a drive head, drive wheels, etc.), etc. so as to provide proper alignment of the tow arm (6) when attempting to inset the tow arm (6) into the receiver hitch (1) and mechanically engage with the receiver hitch (1) of a cart (22). One cart (22) may have dimensions that differ from another cart (22). Thus, the tow arm (6) may have to be positioned at a first height to connect to the receiver hitch (1) of one cart (22), positioned at a second height to connect to the receiver hitch (1) of another type of cart (22), etc. Similarly, the arms (107) may not need to be extended for navigation when the robot (16) is towing a one cart (22), but may have to be extended when towing another type of cart (22). While sensor data can be used to determine the dimensions of the cart (22), it is contemplated for an identifier (5) to be included with the receiver hitch (1). For instance, the identifier (5) can be attached to or associated with the receiver hitch (1). The term "associated with" used herein includes attached to, incorporated, applied to, connected to, in communication with, paired with, etc. With the receiver hitch (1) attached to the cart (22) and including identifying information about the cart (22), the identifier (5) is associated with a cart (22). The identifier (5) of the receiver hitch (1) can be configured to identify a specific cart (22), a specific type of cart (22), etc. The identifier (5) can be an RFID tag, a bar code, a QR code, etc. A sensor (108) (e.g., camera, RFID reader/scanner, antenna, etc.) on the robot (16) and/or the tow arm (6) can be used to read the identifier (5). The sensor (111) can include a processor to process the data or transmit the data to the computing unit (25) for processing.

In an exemplary embodiment, the identifier (5) is located on the rear plate (32) and the sensor (108) is located on the tow arm (6). The identifier (5) is an RFID tag and is encoded with identifying information about the cart (22). When the robot (16) is in close proximity to the cart (22), the sensor (108) (e.g., an antenna (40)) picks up the RFID tag information. This information is used by the computing unit (25) to identify the cart (22), wherein the computing unit (25) then refers to a lookup stored in memory (106) to obtain parameters (e.g., dimensions, weight constrains, etc.) of the cart (22). In addition, or in the alternative, the computing unit (25) can transmit the identifier (5) information to a computer (27), wherein that computer (27) refers to a lookup stored in its memory to obtain parameters (e.g., dimensions, weight constrains, etc.) of the cart (22). In addition, or in the alternative, the computing unit (25) and/or the computer (27) can access the lookup table from a database (109) that is in communication with the computing unit (25) and/or the computer (27).

The lookup table can include information about the cart (22) such as the type of cart (22), the dimensions of the cart (22), weight constraints, travel restrictions (e.g., where the cart (22) can be transported to, prohibited areas for the cart (22), etc.), etc. With this information, the computing unit (25) can not only adjust the arm(s) (107) as discussed above, but also the sensors (108) (e.g., positioning, sensitivity, activation/deactivation, etc.), data processing of sensor data, components of the drive system to control the robot's (16) speed, navigation engine, etc. This adjustment can include adjusting an operational parameter of a sensor (108). This can include which sensor (108) to use, which type of sensor(s) (108) to use, which type of data processing to use (e.g., which type of sensor fusion to use) when processing sensor data, beam width, beam length, mode of operation, etc. In addition, or in the alternative, the adjustment can include adjusting a physical orientation of the sensor(s) (108). This can include rotating/positioning of sensor(s) (108), extension or retraction of an arm (107), adjusting orientation of a sensor (108), adjusting direction the sensor (108) is facing, etc. For instance, if the information about the cart (22) indicates that the cart (22) has a longer length, the arm(s) (107) can be extended to provide a better field of view. However, it is generally desirable for the robot (16) to have a small profile, especially when travelling about the facility, and so the computing unit (25) can determine how far to extend the arm(s) (107) so as to extend only as far out as needed. In addition, other sensors (108) can be activated to assign in the navigation, or any of the sensor's (108) sensitivity, frequency of sensing, etc. can be adjusted. In addition, any of the sensors (108) can be attached to a rotatable mechanism (e.g., a rotary motor, a gimbal assembly, etc.) to allow the sensor (108) to be rotated. This rotatable mechanism can include a processor and be in communication with the computing unit (25). The computing unit (25) can send command signals to control the angle at which the sensor (108) oriented. As a non-limiting example, if the cart (22) information indicates that the cart (22) is wide, a sensor (108) can be rotated outward to provide a wider view.

In an exemplary embodiment, the computing unit (25) can include a navigation engine configured to provide the robot (16) with autonomous and/or semi-autonomous operation protocols (e.g., a set of rules describing or governing how to operate components of the robot (16) in order to cause the robot (16) to move, stop, turn, follow predetermined paths, follow delivery schedules, etc.). The navigation engine can use virtual maps of the facility within which the robot (16) operates and sensor data, delivery schedules, predetermine paths, etc. and applies program logic pertaining to speed controls, turning radius controls, etc. to convert the operation protocols into command signals to operate the robot (16). The navigation engine can also include logic programming, artificial intelligence, machine learning, etc. to plan routes, optimize delivery schedules, etc. The navigation engine informs the computing unit (25) in the form of computer instructions of which path(s) to take, which speeds to operate, if/how to avoid obstacles, when/where to travel, where to transport carts (22), where/when to pick up or drop off carts (22), etc. The computing unit (25) translates these computer instructions into command signals that prescribe how the components of the robot (16) are to operate or be activated/deactivated. As a non-limiting example, the navigation engine can receive the information about the cart (22) based on the identifier (5) and prescribe a speed, a turning radius, and/or a travel restriction for the robot (16). For instance, the cart information for a cart (22) may indicate that the cart (22) has a length that requires a wider turning radius so as to prevent the cart (22) from hitting a corner of a wall when the robot (16) is maneuvering around a bend. The information for another cart (22) may indicate that the cart (22) has a length that required a narrower turning radius. As another example, the information for the cart (22) may indicate that the cart (22) is top heavy so the robot's (16) speed should be lower to prevent toppling. As another example, the information for the cart (22) may indicate that the cart's (22) height is too high to travel in certain areas of the facility so transportation of the cart (22) should be limited to predetermine paths that can accommodate such heights.

Figure 3:
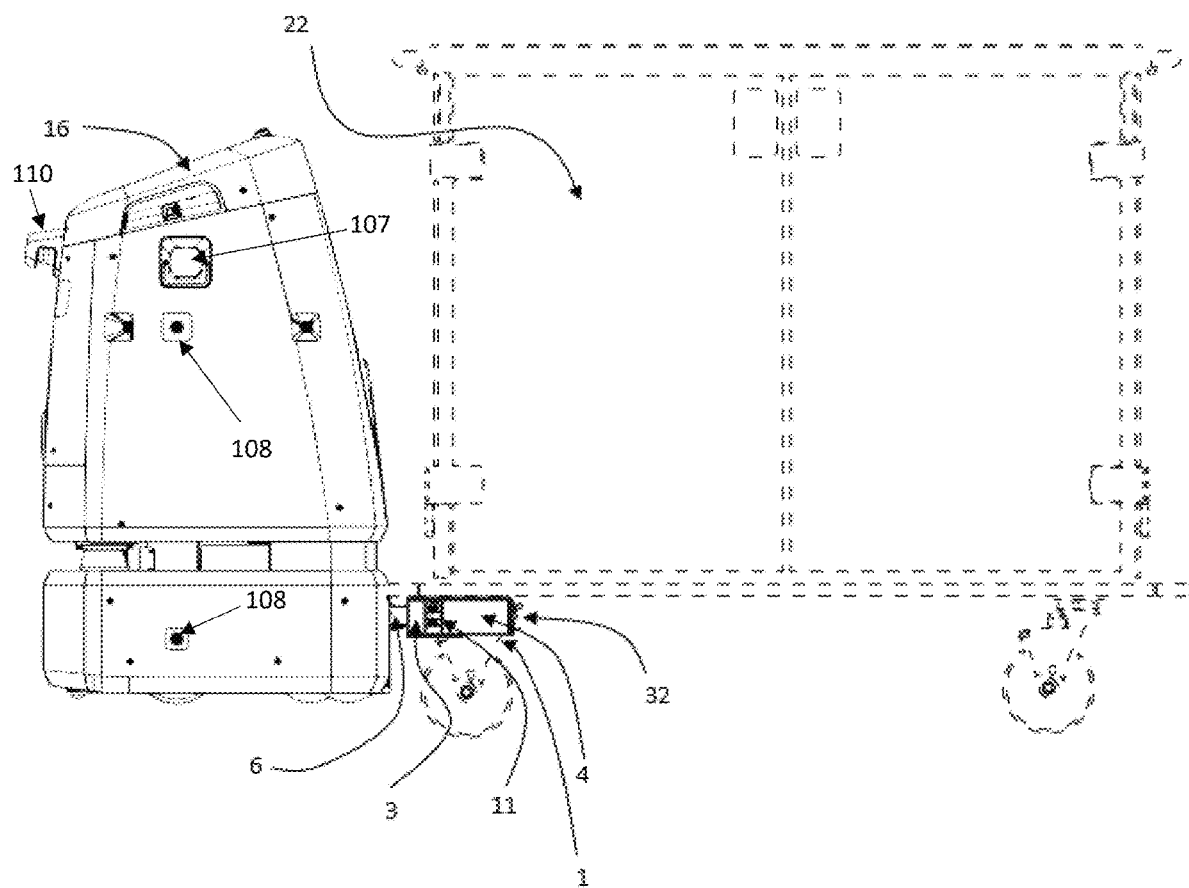
FIG. 3 is a side view of an exemplary robot ready to tow an exemplary cart in accordance with an embodiment of the present invention.

FIG. 3 is a side view of an embodiment of the robot (16) ready to tow an exemplary cart (22). For convenience, the cart (22) is shown in broken lines. As shown in FIG. 3, the tow arm (6) is deployed via the pivot mechanism (12) and lowered via the linear actuator (10) to match the height of the receiver hitch (1) which is attached to an exemplary cart (22). The tow arm (6) is lowered and then the robot (16) is driven backward to position the tow arm (6) into the receiver hitch (1), wherein the converging side members (4) of the receiver hitch (1) can assist with proper alignment between the tow arm (6) and receiver hitch (1). The robot (16) adjusts its position to be approximately square to the receiver hitch (1). This can be achieved via sensor data processing. For instance, any of the sensors (108) can, based on the capacitive force, inductive force, etc., determine whether the two arm (6) is properly aligned. For example, there may three sensors located on the two arm (6) and corresponding three sensors (108) on the receiver hitch (1). The computing unit (25) can use a triangulation calculation to determine proper alignment. The computing unit (25) can then send command signals to the drive system of the robot (16) to cause it to adjust its position accordingly. It is understood that other methods for determining proper alignment can be used. Then the clamps (11) on the end effector (9) close onto the side posts (3) of the receiver hitch (1) to secure the cart (22) for towing by the robot (16).

FIG. 4 illustrates the front of an exemplary robot (16) with an embodiment of the extendable side sensors (108) extended to allow the sensors (108) to see beyond the edge of the cart (22). Before attachment, an antenna (40) on the robot (16) detects the passive RFID signal transmitted by the identifier (5) (e.g., RFID tag). Alternately, the identifier (5) can be a visual label provided on the receiver hitch (1) which is detected by a camera (108) on the robot (16). Each unique cart serial number is registered in a database (109) and assigned cart attributes such as (but not limited to) height of receiver hitch, length of cart, height of cart, width of cart, maximum weight, etc. Once the robot (16) received and knows the various attributes of the cart (22), the robot (16) electromechanically adjusts its sensors (108) based on the returned parameters from the database to extend beyond the outside edges of the cart (22). This provides sideward and rearward sensor coverage even when the cart (22) exceeds the default sensor envelope of the robot (16). Typically, when not pulling a cart (22) the sensors (14) will remain in a retracted position (see FIG. 2).

FIG. 5 illustrates an exemplary process in which the robot (16) identifies the cart (22) it intends to haul. The exemplary RFID tag (5) mounted on the receiver hitch (1) emits a signal (23) containing the unique cart identification data for that particular cart (22). An internally mounted antenna (40) in the robot (16) (alternately an external antenna (40) can be provided) receives the signal (23) and communicates with a computing unit (25) also internally mounted in the robot (16). The computing unit (25) communicates with a remote computer (27) over, for example, WiFi, Bluetooth, or other long or short range communication signal (26). The remote computer (27) looks up the unique cart identification data determined from the signal (23) and returns its properties (28) to the robot's computing unit (25) for the purposes of determining how to raise/lower and position the tow arm (6) for attachment to the receiver hitch (1) and travel with the cart (22) in tow. The various properties (28) of the cart (22) are provided by the RFID tag (5), including, but not limited to, cart serial number, cart type, cart height, cart width, cart length, etc. Additionally, if the cart is a flat-bed type cart and has a load on it, the properties of the cart with the load can also be provided via the signal (23) emitted by the RFID tag (5).

FIG. 6 illustrates the robot (16) with the tow arm (6) deployed for connection to the receiver hitch (1) in order to tow the cart (22). When the robot (16) identifies the cart (22) through the process described herein, the tow arm (6) is deployed. At this point, the tow arm (6) lowers to the proper height of the receiver hitch (1) as specified in the lookup table (28) (see FIG. 5). The robot (16) backs up to the receiver hitch (1) and the end effector (9) self-centers between the converging side members (4) of the receiver hitch (1).

The robot (16) moves in a sideward direction with the end effector (9) pressed into the receiver hitch (1) to mechanically align the end effector (9) and tow arm (6) squarely with the receiver hitch (1). At least one of the sensor(s) (108) can be used to detect this alignment (e.g., using any of the alignment techniques discussed above). Once aligned, the end effector (9) clamps (11) are retracted onto the side posts (3) to secure the receiver hitch (1) to the robot (16) for towing the cart (22). Based on the parameters (28) of the cart (22) the arms (107) are extended to extend beyond the outside edges of the cart (22) to provide sideward and rearward sensor coverage even when the cart (22) exceeds the default sensor envelope of the robot (16).

Figure 7:
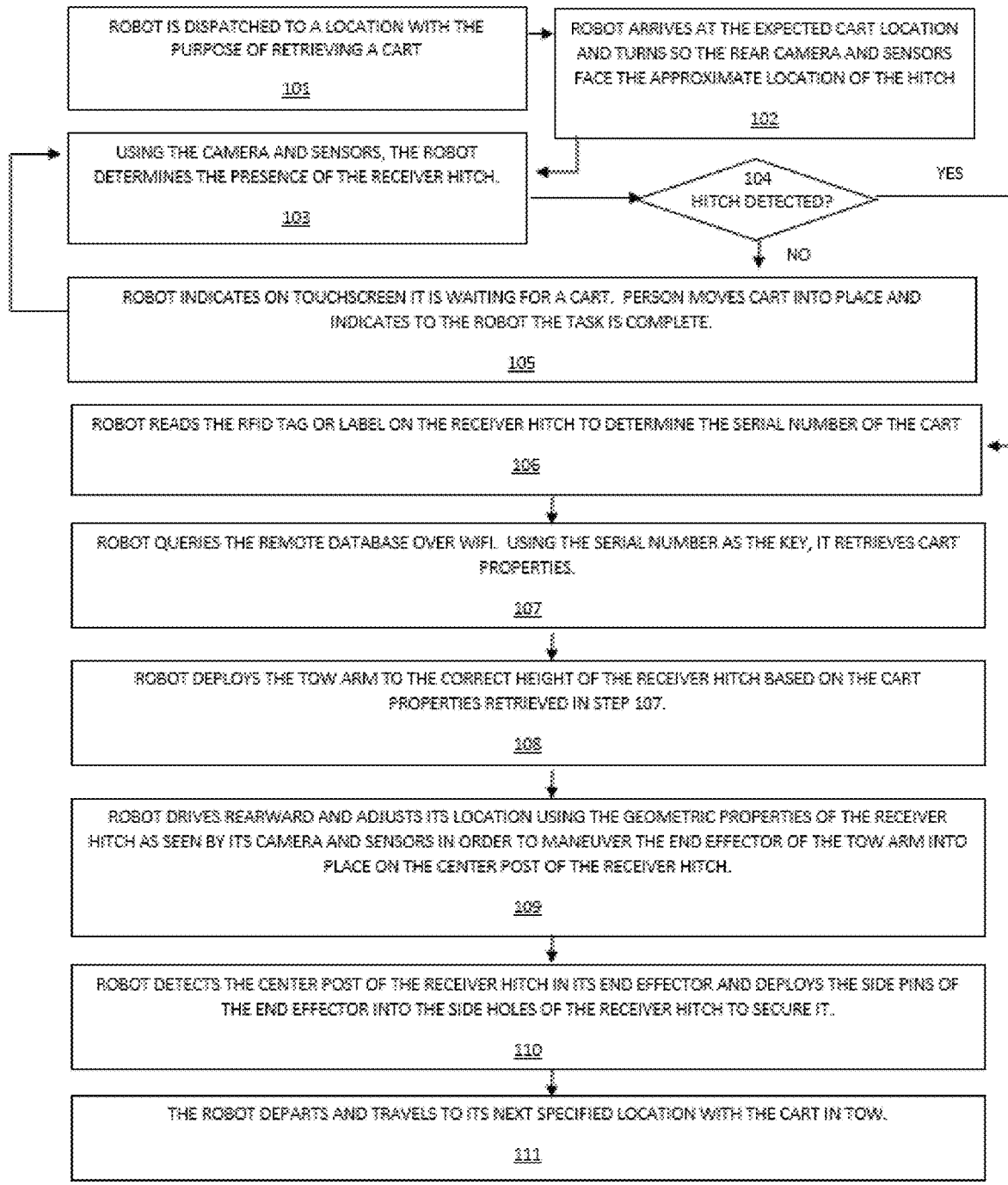
FIG. 7 illustrates a flowchart depicting exemplary steps performed for an autonomous mobile robot to retrieve a cart in accordance with an embodiment of the present invention.

FIG. 7 illustrates an exemplary flowchart depicting the steps performed for an autonomous mobile robot (16) to retrieve a cart (22) in accordance with an embodiment of the present invention. At step 101, the robot (16) is deployed to a certain location for the purpose of retrieving a cart (22) therefrom. For instance, the navigation engine causes the robot (16) to follow a predetermine path based on a delivery or pick-up schedule. The predetermine path can have drop-off and/or pickup locations at which the robot (16) is supposed to delivery or pick up a cart (22). In the case of a cart (22) pick-up, upon arrival at the location, at step 102, the robot (16) positions itself so that the camera (108) and/or other sensors (108) face a region of space that is an approximate location of where a receiver hitch (1) provided on the cart (22) would be positioned if a cart (22) was parked there. Using the cameras (108) and/or other sensors (108), at step 103, the robot (16) determines the presence (e.g., the sensor(s) (108) of the robot (16) detects an identifier (5)) or absence (e.g., the sensor(s) (108) of the robot (16) does not detect an identifier (5)) of a receiver hitch (1). The computing unit (25) uses a detection of a presence of a receiver hitch (1) as an indication that a cart (22) is present at the location.

The computing unit (25) uses a detection of an absence of a receiver hitch (1) as an indication that a cart (22) is not present at the location.

If the presence of a receiver hitch (1) is detected at step 104, the method proceeds to step 106 where the robot (16) reads the RFID tag (5) or other label on the receiver hitch (1) to determine the serial number of the cart (22) (e.g., the sensor (108) transmits sensor data to the computing unit (25) and the cart (22) information is obtained using the method(s) described herein). If the absence of a receiver hitch (1) is detected at step 104, the method proceeds to step 105 where the robot (16) indicates on its user interface (110) that it is waiting for a cart (22) (e.g., the computing unit (25) sends a command signal to the user interface (110) to display a message indicating that the robot (16) is waiting for a cart (22)). An individual at the location will see that the robot (16) is waiting for a cart (22) and can move a cart (22) into place. The robot (16) can then detect the presence of a receiver hitch (1) and/or an individual can indicate to the robot (16), via input into the user interface (110), that a cart (22) is at the location and the robot (16) can perform the function of identifying the cart (22). The method then proceeds back to steps 103 and 104 to detect the presence of a receiver hitch (1) as previously described. Steps 103, 104 and 105 are repeated until a receiver hitch (1) is detected at step 104.

At step 107, the robot (16) queries the remote database (109) via Wifi, Bluetooth, or other long or short range communication signal (26). Using the serial number of the cart (22) as a key, the robot (16) retrieves the cart properties (28). At step 108, based on the retrieved cart properties (28), the robot (16) deploys the tow arm (6) and adjusts the tow arm (6) to the correct height of the receiver hitch (1).

At step 109, the robot (16) then drives rearward while adjusting its location using the geometric properties of the receiver hitch (1) as determined by the camera (108) and/or other sensors (108) to maneuver the end effector (9) of the tow arm (6) into place on the side post (3) of the receiver hitch (1).

At step 110, the robot (16) detects the presence of the side post (3) of the receiver hitch (1) in the end effector (9) and deploys the clamps (11) of the end effector (9) to secure the cart (22) to the robot (16).

At step 111, the robot (16) departs with the cart (22) in tow and travels to the next desired location where the cart (22) is to be delivered.

It should be noted that an additional step 110*a* can be provided after step 110. After the cart (22) is secured to the robot (16) at step 110, based on the parameters (28) of the cart (22), the arms (107) can be extended to extend beyond the outside edges of the cart (22) to provide sideward and rearward sensor coverage even when the cart (22) exceeds the default sensor envelope of the robot (16), at step 110*a*.

FIG. 8 illustrates an exemplary flowchart depicting the steps performed for an autonomous mobile robot (16) to deliver a cart (22) to a desired location in accordance with an embodiment of the present invention. At step 201, the robot (16) with the cart (22) in tow arrives at the specified delivery location and comes to a stop. Upon positioning the cart (22) at the desired location, the clamps (11) on the end effector (9) are retracted to release the tow arm (6) from the receiver hitch (1), at step 202.

At step 203, the robot (16) drives forward, with the tow arm (6) extended, to a position far enough that the tow arm (6) is cleared from the cart (22). The camera (108) and/or other sensors (108) provided on the robot (16) detect when the tow arm (6) is clear from the cart (22). Upon determining that the tow arm (6) is clear, the robot (16) raises (e.g., pivots) the tow arm (6) to its stowing location in the stowing zone (7) and then departs to a next or default location.

Figure 9:
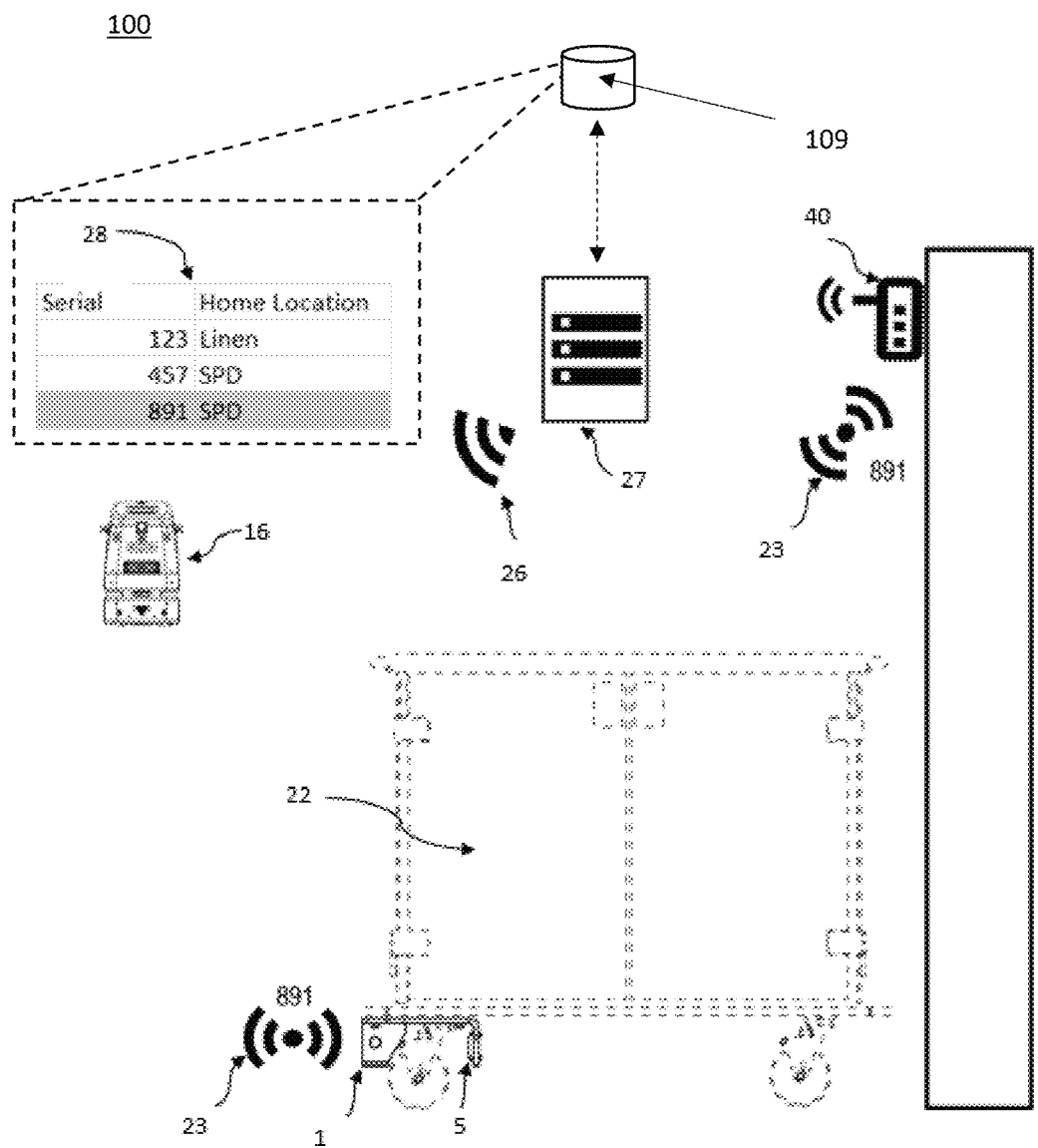
FIG. 9 illustrates the how carts or the absence of carts can be detected in accordance with an embodiment of the present invention.

FIG. 9 illustrates an exemplary configuration illustrating a computer (27) being notified of an exemplary cart (22) that needs to be transported by the robot (16). The receiver hitch (1), having the unique RFID tag (5), is mounted on the exemplary cart (22). The RFID tag (5) emits a signal (23) containing an exemplary serial number, in this case, 891. A wall mounted antenna (40) detects the presence of the RFID signal (23) and publishes a notification to the remote computer (27) with the identity of the wall mounted antenna (40) and the serial number received from the RFID signal (23). The remote computer (27) looks up the identity of the wall mounted antenna (40) to determine its fixed location, and therefore determines the location of the cart (22). The remote computer (27) communicates to the robot (16) via WiFi (26), or other communication signal, and dispatches the robot (16) to retrieve the cart (22) at the location of the wall mounted antenna (40). It assigns the delivery location of the cart (22) in its internal computing unit (25) based on the rules determined by the computer (27) and/or the navigation engine.

As can be appreciated from the above, the robot (16) can operate within a system (100) comprising the computing unit (25), a computer (27), a database (109) and sensors (108) connected via a communication system. The facility in which the robot (16) operates can include any number of sensors (108) configured to detect an identifier (5). For instance, the facility can have any number of sensors (108) attached to or associated with a structure of the facility. The term "associated with" used herein includes attached to, incorporated, applied to, connected to, in communication with, paired with, etc. With the identifier (5) being an RFID tag, the sensors (108) can be antennae (40), for example. These antennae (40) can be located a predetermined positions (e.g., drop-off locations, pick-up locations, etc.). The antennae (40) can be in communication with a computer (27). The carts (22) in a facility, after being delivered, can be used by individuals and maneuvered about. After use, the carts (22) can be placed in a pick-up location. The antenna (40) at the pick-up location can detect presence of the cart (22) by detecting the identifier (5) on the receiver hitch (1). Sensor data from the antenna (40) is transmitted to a computer (27). The computer (27) transmits a signal to the computing unit (25), informing the computing unit (25) of the pick-up location for the cart (22). The computing unit (25), using the navigation engine, travels to the pick-up location to retrieve the cart (22) and transport the cart (22) to a prescribed location as dictated by the computer (27) and/or the navigation engine.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

The invention claimed is:

1. A robotic system, comprising:
a plurality of robot sensors attached to a robot; and
an identifier attached to a receiver hitch of a cart;
wherein the identifier includes information related to a cart with which the identifier is attached;
wherein at least one robot sensor of the plurality of robot sensors is configured to detect the identifier and transmit sensor data to a computing unit of the robot;
wherein the computing unit of the robot operates the robot and the plurality of robot sensors based on the cart information;
wherein the computing unit includes instructions stored on memory that cause a processor of the computing unit to feed cart information to a navigation engine to generate and modify autonomous or semi-autonomous operation protocols based on the cart information including a dimension of the cart,
wherein the processor of the computing unit converts the autonomous or semi-autonomous operation protocols into a command signal to operate the robot, and
wherein the command signal includes which path to follow, which path to not follow, a speed limit for the robot, and a limit on turning radius for the robot.

2. The robotic system of claim 1, further comprising:
a facility sensor attached to a facility; and
wherein the facility sensor is configured to detect presence or absence of a cart.

3. The robotic system of claim 1, further comprising the robot.

4. The robotic system of claim 1, further comprising the receiver hitch.

5. The robotic system of claim 3, further comprising the cart.

6. The robotic system of claim 1, further comprising the computing unit of the robot.

7. The robotic system of claim 2, wherein the facility sensor is attached to a structure at a predetermined location of the facility.

8. The robotic system of claim 7, wherein the location is a delivery location or a pick-up location for the cart.

9. The robotic system of claim 8, wherein:
the facility sensor is configured to transmit sensor data to a computer of a computer system.

10. The robotic system of claim 1, wherein:
at least one robot sensor of the plurality of robot sensors is an antenna; and
the identifier is a RFID tag.

11. The robotic system of claim 1, wherein:
at least one robot sensor of the plurality of robot sensors is a scanner; and
the identifier is a barcode.

12. The robotic system of claim 1, wherein:
the operation protocols are based on the cart type, and a weight restriction for the cart.

13. The robotic system of claim 1, wherein:
the computing unit of the robot includes instructions stored on memory that cause the processor of the computing unit to adjust a physical orientation and an operational parameter of at least one robot sensor of the plurality of robot sensors.

14. The robotic system of claim 13, wherein:
the adjustment the physical orientation and the operational parameter of the at least one robot sensor of the plurality of robot sensors is based on a dimension of the cart, the cart type, and a weight restriction for the cart.

15. The robotic system of claim 9, further comprising the computer of the computer system, wherein:
the computer includes instructions stored on memory that cause a processor of the computer to determine presence or absence of the cart at the predetermined location.

16. The robotic system of claim 15, wherein:
the instructions cause the processor of the computer to transmit a command signal to the computing unit of the robot based on the determined presence or absence of the cart at the predetermined location.

17. The robotic system of claim 16, wherein:
the instructions cause the processor of the computer to transmit a command signal to the computing unit of the robot to cause the robot to travel to the predetermined location at which the presence of the cart is determined.

18. A robotic system, comprising:
a computing unit for a robot, the computing unit including a navigation engine configured to generate and/or modify autonomous or semi-autonomous operation protocols for the robot;
an identifier attached to a receiver hitch of a cart; and
a plurality of sensors attached to a robot, at least one sensor of the plurality of sensors configured to detect the identifier;
wherein the operation protocols include rules causing the robot to travel to a location to retrieve the cart; and
wherein:
the computing unit is configured to receive sensor data and determine the presence or absence of the cart at the location;
when the absence of the cart at the location is determined, the computing unit causes the robot to remain at the location; and
when the presence of the cart at the location is determined, the computing unit causes the robot to engage the receiver hitch with a tow arm of the robot.

19. The robotic system of claim 18, comprising:
a user interface for the robot, the user interface in communication with the computing unit;
wherein when the absence of the cart at the location is determined, the computing unit causes the user interface to generate a message indicating that the robot is remaining at the location.

20. A robotic system, comprising:
a plurality of robot sensors attached to a robot; and
an identifier attached to a receiver hitch of a cart;
wherein the identifier includes information related to a cart with which the identifier is attached;
wherein at least one robot sensor of the plurality of robot sensors is configured to detect the identifier and transmit sensor data to a computing unit of the robot;
wherein the computing unit of the robot operates the robot and the plurality of robot sensors based on the cart information;
wherein the computing unit includes instructions stored on memory that cause a processor of the computing unit to feed cart information to a navigation engine to generate and modify autonomous or semi-autonomous operation protocols based on the cart information including a dimension of the cart;
wherein the computing unit of the robot includes instructions stored on memory that cause the processor of the computing unit to adjust a physical orientation and an operational parameter of at least one robot sensor of the plurality of robot sensors; and
wherein the adjustment the physical orientation and the operational parameter of the at least one robot sensor of the plurality of robot sensors is based on a dimension of the cart, the cart type, and a weight restriction for the cart.

* * * * *